(12) United States Patent
Veroni

(10) Patent No.: US 8,559,150 B2
(45) Date of Patent: Oct. 15, 2013

(54) ELECTRIC CIRCUIT BREAKER

(75) Inventor: Fabio Veroni, Vimercate-Milano (IT)

(73) Assignee: Enel Distribuzione S.p.A., Rome (IT)

( * ) Notice: Subject to any disclaimer, the term of this patent is extended or adjusted under 35 U.S.C. 154(b) by 0 days.

(21) Appl. No.: 12/453,646

(22) Filed: May 18, 2009

(65) Prior Publication Data

US 2009/0225483 A1   Sep. 10, 2009

Related U.S. Application Data

(63) Continuation of application No. 10/553,168, filed as application No. PCT/EP03/04090 on Apr. 17, 2003, now Pat. No. 7,564,667.

(51) Int. Cl.
*H02H 9/02* (2006.01)
*H02H 9/08* (2006.01)
*H02H 3/00* (2006.01)
*H02H 7/00* (2006.01)

(52) U.S. Cl.
USPC ................................. 361/93.1; 361/2; 361/42

(58) Field of Classification Search
USPC .............................................. 361/93.1, 42, 2
See application file for complete search history.

(56) References Cited

U.S. PATENT DOCUMENTS

| | | | |
|---|---|---|---|
| 2,310,126 A | 2/1943 | Skeats | |
| 2,839,092 A | 6/1958 | Purdy et al. | |
| 3,159,768 A | 12/1964 | Flanagan | |
| 4,142,136 A * | 2/1979 | Witter | 318/779 |
| 4,514,685 A | 4/1985 | Gilker | |
| 5,231,365 A | 7/1993 | Kato | |
| 5,359,711 A | 10/1994 | Hartmann et al. | |
| 5,369,542 A | 11/1994 | Leone et al. | |
| 5,710,691 A | 1/1998 | Fowler et al. | |
| 5,854,731 A | 12/1998 | Thomas | |
| 5,943,204 A | 8/1999 | Jones et al. | |
| 5,966,281 A | 10/1999 | Larson | |
| 6,204,751 B1 | 3/2001 | Bolda et al. | |

(Continued)

FOREIGN PATENT DOCUMENTS

| | | |
|---|---|---|
| EP | 0 571 898 | 12/1993 |
| FR | 2 751 784 | 1/1998 |

(Continued)

OTHER PUBLICATIONS

International Search Report mailed Jan. 2, 2004 in corresponding International Application PCT/EP03/04090.
International Preliminary Examination Report for International Application No. PCT/EP03/04090 dated May 2, 2005.

*Primary Examiner* — Jared Fureman
*Assistant Examiner* — Lucy Thomas
(74) *Attorney, Agent, or Firm* — Nixon & Vanderhye P.C.

(57) ABSTRACT

An electric circuit breaker apparatus protects an electrical circuit against excessive current loads. A first remotely programmable circuit breaker trip device receives an external command with a programmable current threshold, detects a current level in the electrical circuit, and may cause a break in the electrical circuit depending on the detected current level in accordance with a first current duration associated with the stored programmable current threshold. A second electrical circuit breaker trip device is arranged to cause a break in the electrical circuit in accordance with a second current duration different, e.g., shorter, than the first current duration if a current flowing in the electrical circuit exceeds a predetermined rated current for more than the second current duration.

28 Claims, 11 Drawing Sheets

(56) References Cited

U.S. PATENT DOCUMENTS

| | | |
|---|---|---|
| 6,233,128 B1 * | 5/2001 | Spencer et al. ............... 361/86 |
| 6,361,205 B2 | 3/2002 | Anderson |
| 6,515,840 B2 | 2/2003 | Covi et al. |
| 6,853,274 B2 | 2/2005 | Millburn et al. |
| 7,064,654 B2 | 6/2006 | Berkman et al. |
| 7,630,185 B2 * | 12/2009 | Fiesoli et al. ............... 361/93.1 |
| 2002/0101695 A1 | 8/2002 | Saksa |
| 2002/0135237 A1 | 9/2002 | Baker |

FOREIGN PATENT DOCUMENTS

| | | |
|---|---|---|
| JP | 61 069324 | 4/1986 |
| JP | 07 312151 | 11/1995 |
| JP | 11 150863 | 6/1999 |
| JP | 2001 286052 | 12/2001 |
| JP | 2002 171659 | 6/2002 |
| JP | 2002 252925 | 9/2002 |

* cited by examiner

ELECTRIC CIRCUIT BREAKER

This application is a continuation of U.S. application Ser. No. 10/553,168, filed on Oct. 17, 2005, now U.S. Pat. No. 7,564,667, which is a U.S. national stage application of PCT/EP2003/004090, filed on Apr. 17, 2003, the entire content of which is hereby incorporated by reference in this application.

TECHNICAL FIELD

The present invention relates to an electric circuit breaker for protecting an electrical circuit against excessive current loads.

BACKGROUND

Electric circuit breakers are typically used in electricity distribution networks at various locations in the network, in order to monitor the current level flowing in the network, and to interrupt the electrical current if the current level flowing through the electric circuit breaker exceeds certain thresholds or limits.

In order to achieve an adequate protection in the low voltage portion of the network, thermo-magnetic circuit breakers are generally used. A thermo-magnetic circuit breaker inserted in an electrical circuit will automatically break the electrical circuit to disconnect a portion of the network, if the current level through the electric circuit breaker exceeds a dangerous level, i.e. when an overload condition occurs. In this type of circuit breaker, this is typically accomplished by means of a resistive thermal element which will modify its mechanical dimensions with temperature due to the increased current level. A thermal element will, however, not instantaneously respond to an overload condition. Rather, the time required by the thermal element for varying its mechanical dimensions depends on its thermal mass, and on the other hand also on the amount of overload current. The time required by the thermal element for responding to the particular overload condition accordingly varies between fractions of a second and about one hour. Obviously, also the ambient temperature has an influence on this response time. The non-instantaneous response characteristics of the thermal element are appropriate for protecting the electrical circuit and thus the entire network against a continuous overload condition caused e.g. by a parallel connection of too many loads to the electric circuit, whereas short current spikes will not cause an unwanted tripping of the electric circuit breaker. Such current spikes are generated when electric loads like television sets or electric motors are switched on.

On the other hand, the non-instantaneous response characteristics make an electric circuit breaker with only a conventional thermal element less suitable for protecting its associated network portion against very high levels of overcurrent which may be caused e.g. by a short circuit condition. In this situation a fast response of the circuit breaker is required.

In order to provide a fast response time in such extreme overload conditions, a conventional electric circuit breaker for use in the LV network therefore also comprises an electromagnetic element, e.g. a coil, which will generate a magnetic force depending on the amount of current flowing through the circuit breaker. If the force generated by the magnetic element exceeds a certain force threshold, the magnetic element will trip the electric circuit breaker with some milli seconds of delay in order to prevent instantaneous damages in the network.

Besides this conventional type of thermo-magnetic circuit breaker, other conventional types of electric circuit breakers comprise a thermal element only, or an electromagnetic element only, for breaking the electrical circuit when an overload condition has occurred.

Each of these and other types of conventional electric circuit breakers has a so-called rated current. This parameter describes the current level beyond which the circuit breaker is supposed to break the electrical circuit. A current level above the rated current level constitutes an overload condition which will eventually lead to the tripping of the electric circuit breaker. The rated current is determined by the design of the circuit breaker, e.g. the size, thermal mass, mechanical bias and the like of the thermal and/or electromagnetic elements. Nowadays, a variety of electric circuit breakers is on the market for a variety of different rated currents, adapted to the variety of needs which arise from the existing variety of types of consumers, load levels and network load constraints. However, one or more of these parameters of an electrical installation may change sometimes for various reasons. In a power distribution network a need may arise to update the tripping current level or the degree of protection for the circuit protected by the circuit breaker. To achieve this with conventional circuit breakers, it is necessary to replace the existing electric circuit breaker having a first rated current by another electric circuit breaker having another rated current adapted to the new situation. This is laborious, time consuming and can be particularly disadvantageous in large electricity distribution networks. A change of the tripping current level during the ongoing operation of the circuit breaker is impossible.

The necessity to provide and install a variety of different circuit breakers with a variety of given rated currents leads to inflexibilities with adverse impacts on the costs for network maintenance and administration. More flexibility in this regard would be highly desirable.

SUMMARY

The present invention has been made in order to solve these and other problems associated with the prior art. An electric circuit breaker according to an example, non-limiting embodiment comprises a switch to be arranged in the electrical circuit which is to be protected against excessive current loads. The circuit breaker furthermore comprises first means for causing said switch to break the electrical circuit in response to a tripping signal. Means are provided for receiving and storing a programmable current threshold command. The circuit breaker detects a current level in the electrical circuit, and processing means are provided for generating said tripping signal depending on said stored current threshold command and said detected current level.

This example embodiment of an electric circuit breaker according to the present invention is advantageous in that the load protection characteristics of the circuit breaker provided are programmable. In this way an electric circuit breaker is obtained which is suitable for a variety of consumers, load levels and network load constraints, without the need to perform replacement work or to keep a large number of different types of circuit breakers available.

The programming of the electric circuit breaker can be performed in a variety of different ways. Preferably, the electric circuit breaker includes power line communication means for receiving current threshold commands via the electric circuit protected by the circuit breaker. Such received current threshold commands are stored by the electric circuit breaker until another current threshold command is received. Such commands can be generated by a central facility for administrating a given network section which comprises a plurality of consumers and associated electric circuit breakers. It is advantageous to adapt the central facility such that individual current threshold commands can be addressed to individual circuit breakers in the network section. This will allow the network operator to remotely administrate an individual consumer connected to a particular electric circuit breaker with a high degree of flexibility and low administration costs. For example, changes in the supply contract relating to the maximum admissible current consumption can be implemented quickly by reprogramming the electric circuit breaker by remote administration.

In addition or alternatively, it is furthermore advantageous to provide the central facilities such that a current threshold command can be addressed to a group or to all of the electric circuit breakers in the network section. By way of example, in response to the occurrence of a global overload condition in the entire network section administrated by the central facility, appropriate, e.g. lower current thresholds can be programmed into a large number of electric circuit breakers, in order to prevent a global breakdown or blackout without the need to switch off the entire network section. Such global overload conditions may e.g. occur if a large number of consumers simultaneously draws current from the network section at a level which is close to but below the normal current threshold applicable to the consumers. Similarly, under light load conditions in the network section it would be advantageous to program higher current threshold into a group or all of the electric circuit breakers of that section in order to allow a higher individual consumption of current for the consumers of that section.

Alternatively or in addition to the provision of means for receiving programmable current threshold commands via power line communication over the electrical circuit to which the electric circuit breaker is connected, it can be advantageous to provide the electric circuit breaker with a user interface to receive programmable current threshold commands from an operator e.g. through a keyboard, or from a programmer device, e.g. a suitably programmed personal computer, through a suitable standard interface like RS232, USB, blue tooth or the like. Interfaces with a high level of electrical insulation, like flag port devices or in accordance with IEC 61107/EN 61107/IEC62056-21 are particularly advantageous.

Preferably, said means for receiving a programmable current threshold command is adapted to store a plurality of current thresholds and associated response times as specified by the received current threshold command. Preferably, said processing means is adapted to generate said tripping signal when the detected current level in the electrical circuit protected by the electrical circuit breaker has continuously exceeded a stored programmed current threshold for a duration determined by the associated programmed response time. In this way it can be achieved that the response time of the electric circuit breaker is programmable and dependent on the level of overcurrent flowing in the electrical circuit. Preferably, the response times are programmed to decrease with the associated current thresholds increasing, such than the response time for more severe overload conditions will be shorter that the response time for less severe overload conditions. As an alternative to specifying programmable current thresholds and/or associated response times in the current threshold command, it can be advantageous to provide means for storing a plurality of predefined functional relations defining the associated response times for a variety of current levels, and to provide the processing means to select one of these predefined relations in accordance with the received and stored programmable current threshold command.

As a further alternative, said current threshold command can also be used to specify only the response time until said processing means responds to one or more predefined stored current thresholds with the generation of said tripping signal which causes said switch to break the electric circuit.

Advantageously, the electric circuit breaker furthermore comprises means for receiving a switch command, that is a circuit open command or circuit close command, and means for operating said switch to open and close the electrical circuit in accordance with the received switch command. Such switch command can be transmitted via power line communication and allows a remote control of the electric circuit breaker of individual consumers or of groups of consumers from central administration and control facilities.

Advantageously, the electric circuit breaker furthermore comprises second means for causing the switch to break the electrical circuit if a current flowing in the electrical circuit exceeds a predetermined rated current. According to this embodiment, the switch will be caused to break the electrical circuit if the current flowing through the electric circuit breaker exceeds a predetermined rated current for more than a given duration. Under normal conditions of the electric circuit breaker, the switch will trip in response to the tripping signal generated by the processing means in accordance with a variable current threshold which can be programmed from the external into the electric circuit breaker. The second means advantageously provides upper response limits associated with current levels above the rated current for the electric circuit breaker to break the electric circuit, in order to take account of the possibility that a fault occurs in the electric circuit breaker and tripping under a load condition above the programmed threshold does not work. Preferably, the second means for causing the switch to break the electrical circuit as well as the switch form an integral unit. It is particularly convenient to also incorporate said first means into this integral unit.

Advantageously, an electric circuit breaker according to the present invention is incorporated in a power meter or energy meter for measuring the electric energy consumption of a consumer. Advantageously, the electric circuit breaker comprises means like a lever or button for enabling an operator to manually break or close the electric circuit.

Further advantageous non-limiting example embodiments are defined in the dependent claims.

BRIEF DESCRIPTION OF THE FIGURES

In the following, specific non-limiting example embodiments will be described with reference to the accompanying drawings. In the drawings, similar or corresponding elements have been denoted with the same reference signs.

DETAILED DESCRIPTION

Figure 1:
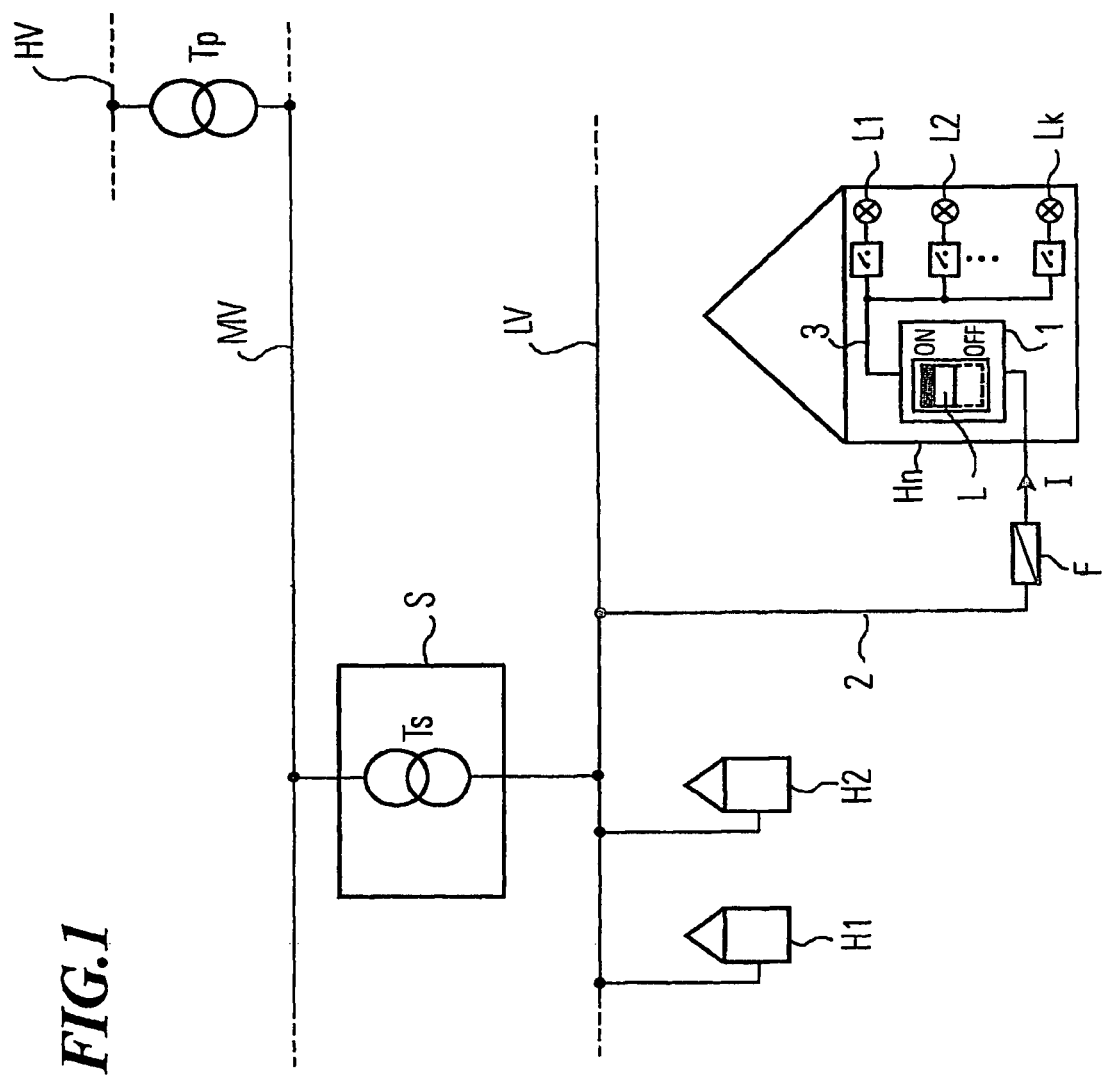
FIG. 1 shows an overview of an electric power distribution network comprising a plurality of electric circuit breakers.

FIG. 1 shows a typical electricity distribution network for distributing electrical energy generated by a power plant (not shown) to a plurality of consumers (H1, H2, . . . Hn). The electricity is distributed over a large geographical area by means of a so-called high voltage network HV, which connects the one or more power plants feeding this high voltage network HV with a plurality of so-called primary substations Tp. The primary substations Tp transform the high voltage (e.g. 380 kV in Europe) carried over the HV network into a medium voltage of e.g. 20 kV for regional distribution of the energy. The medium voltage distribution network MV connects the one or more primary substations Tp with one or more secondary substations Ts which transform the medium voltage carried over the MV network into a low voltage carried over a low voltage network LV for distribution to a large number of consumers H1, H2, . . . , Hn. In Europe, the typical low voltage level is 220 to 240 volt, depending on national regulations. The three power distribution sub networks, that is the HV network, MV network and LV network, require electric circuit breakers at various locations in order to enable the network to appropriately react to fault conditions like short circuits or temporary overload conditions which would otherwise lead to a destruction of the network. Reference numeral 1 denotes an electric circuit breaker located at the consumer premises of consumer Hn.

Reference numeral 2 denotes a supply line connecting the consumer Hn with the LV network. F denotes a fuse provided in the line 2 for safety reasons in order to prevent that an excessive current I causes damage to the LV network. Reference numeral 3 denotes a power supply line at the consumer premises Hn, e.g. a power supply line installed inside a building. Power supply line 3 is connected with the power supply line 2 through the electric circuit breaker 1. The power supply line 3 in turn feeds a plurality of electric loads L1, L2, . . . , Lk through switches as appropriate. L denotes a lever arranged at the electric circuit breaker 1 to be externally accessible by an operator, for manually connecting or disconnecting the power supply 3 and the power supply line 2. Structure similar to that what has been shown in greater detail for the consumer Hn may be found in the other consumers H1, H2, . . . , .

Figure 2:
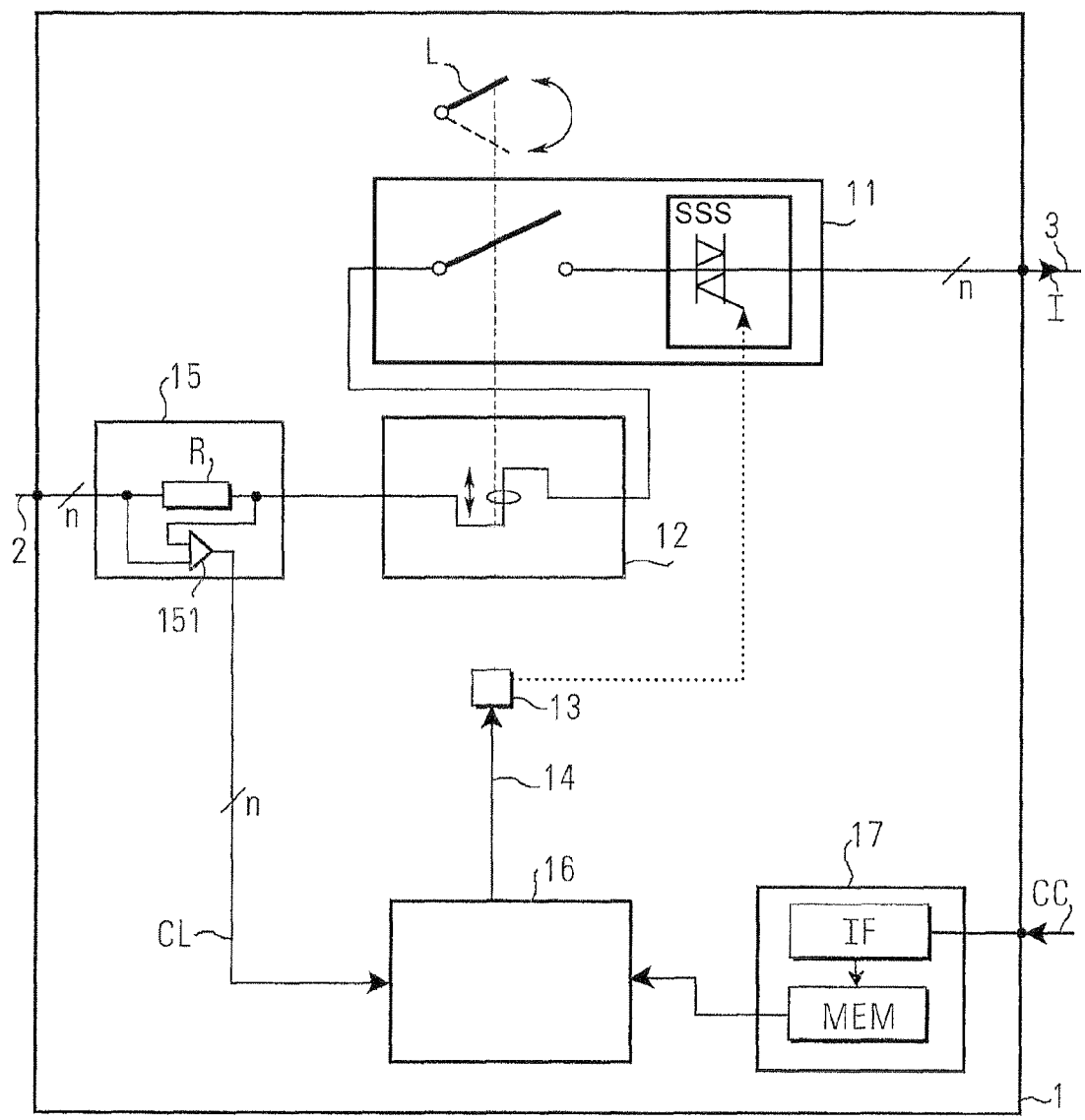
FIG. 2 shows a block diagram of a first embodiment of an electric circuit breaker.

FIG. 2 shows a first example embodiment of an electric circuit breaker. In the block diagram of FIG. 2, reference numeral 1 denotes the electric circuit breaker which is connected between the power supply line 2 and the power supply line 3 shown in FIG. 1. The character n across the power supply lines 2 and 3 and other lines in the electric circuit breaker indicates that while for reasons of simplicity a single phase arrangement is shown in the figure, a poly phase design is not different in principle from the single phase design shown in this and other drawings, and that the present description applies to single phase power supply systems (n=1) as well as to poly phase power supply systems, e.g. n=3. Reference numeral 11 in FIG. 2 denotes a switch connected in series with first means 12 for thermo-magnetically detecting the level of the current I flowing through the power supply line 3. Such a thermo-magnetic current detector 12 is well known in the art, and a detailed description of the thereto-electric current detector 12 is, therefore, not necessary. As indicated by the dotted line in FIG. 2, the thermo-magnetic current detector 12 is mechanically coupled with the switch 11 in order to cause the switch 11 to break the electrical circuit established by the power supply line 3 and its connected electrically loads, in short the electrical circuit 3, if the current I flowing in the electrical circuit 3 exceeds a predetermined rated current. This predetermined rated current is determined by the design of the thermo-magnetic current detector 12. This element 12 typically comprises, e.g., a resistive element not shown in FIG. 2, which will change its temperature in accordance with the current load I. A bi-metal arrangement can conventionally be used to transform the change of temperature into a mechanical displacement which is then taken to trip the switch 11 and break the electrical circuit 3. The current detector 12 furthermore comprises an electromagnetic current detector mechanically coupled with the switch 11, as indicated by the dotted line in FIG. 2. The electromagnetic current detector can be implemented, e.g., by a coil connected in series with the switch 11, such that an electromagnetic force is generated by that coil in accordance with the level, of current I flowing in the electric circuit 3. If this magnetic force generated by the current detector 12 exceeds a predefined force threshold determined by the design of the current detector 12 and/or the switch 11, this will cause the switch 11 to break the electric circuit 3. L denotes an externally accessible lever L to enable a user to manually trip the switch 11. A variety of designs of the switch 11, the thermo-magnetic current detector 12 as well as the electrical and mechanical coupling between the elements 11 and 12 are known.

Reference numeral 15 denotes a current detector for detecting the level of current I flowing in the electrical circuit 3. In FIG. 2, the current detector 15 for detecting the current level I is shown to be connected in series with the switch 11 and the thermo-magnetic current detection means 12. R denotes a resistive element in series with the electric circuit 3. Reference numeral 151 denotes an amplifier for detecting the voltage drop occurring across the resistive element R in proportion with the current level I, and outputting a corresponding current level detection signal CL. At this stage it is important to note that there exists a variety of well known current detection circuits and techniques, and the specific implementation depicted in FIG. 2 shall not be construed to limit the current detector 15 to the implementation shown. As an alternative to the shunt resistor R it would also be possible to adopt a current transformer, e.g. realized by means of an additional winding magnetically coupled with a coil in the current detector 12 which generates the magnetic force for tripping the switch 11 in case of excessive current levels I. This additional winding together with the coil constitutes a transformer in order to implement the current detector 15. Other possibilities of implementing the current detector 15 comprise hall effect devices, magneto resistors and Rogosky coils, all of them being known and suitable for the current detector 15.

Reference numeral 13 denotes a triggering device for causing the switch 11 to break the electrical circuit 3 in response to a tripping signal 14. The triggering device 13 preferably comprises an electromagnetic coil for magnetizing a movable member made from soft iron in accordance with the tripping signal 14. Upon magnetization, a magnetic force will be exerted upon the soft iron member in the element 13. This member is mechanically coupled with the switch 11, as indicated by the dotted line in FIG. 2, such that in response to the tripping signal 14, the element 13 will cause the switch 11 to break the electrical circuit 3. The element 13 can be implemented in a variety of ways in order to achieve the desired function, to trip the switch 11 in response to a tripping signal 14. An alternative implementation of the element 13 exploits the known effect of magnetostriction and comprises a member made from magnetostrictive material which is subjected to a magnetic field generated by a coil in the element 13 which receives the tripping signal 14, such that upon this tripping signal 14, the magnetostrictive element will change its mechanical dimensions. This element is mechanically coupled to the switch 11, such that the switch 11 will trip upon the application of the tripping signal 14 to the element 13.

Reference numeral 17 denotes a receiver for receiving a programmable current threshold command CC. This current threshold command is an external command, that is a command not generated autonomously by the electric circuit breaker 1. This current threshold command CC is received by a suitable communication interface IF in the receiver 17 and then passed on to a memory MEM wherein the received current threshold command can be stored. The communication interface IF can be a power line communication interface for receiving current threshold commands CC through the power supply line 2 and the LV network connected to the power supply line 2. The communication interface IF can also be designed to receive current threshold commands CC through a standard communication interface like RF 232 or USB or some kind of proprietary wire based or infrared or blue tooth interface for communication with a hand held programming device or a personal computer (PC). Alternatively or in addition, the communication interface IF can comprise a key pad for receiving current threshold commands CC through manual user input, preferably in encrypted form or subject to successful user authentication in order to .avoid an unauthorized or illegal access to the means 17 for receiving programmable current threshold commands.

Reference numeral 16 denotes a data processor which receive information CL regarding the detected current level from the current detector 15, and which processor 16 furthermore receives information about the current threshold command stored in the memory MEM of the current threshold command receiver 17. The processor 16 outputs the tripping signal 14 as a result of processing operations which depend upon the input of the current level information CL and the current threshold command stored in the memory MEM, and preferably also depending upon temporal characteristics of the detected current level CL, as will be explained in greater detail further below. The processor 16 may be implemented in hardware or by suitably programming a micro controller. The processor 16 also comprises driver circuitry to drive the element 13, specific example embodiments of which will be shown below. If a micro controller is adopted for implementing the processor 16, the micro controller can also take over at least some of the functions of the current threshold command receiver 17. Embedded micro controller solutions are available on the market, comprising on-chip interfaces which can be used to implement the command receiving interface IF of the element 17.

In order to explain the operations performed by the processor 16 in greater detail by way of example, reference will be made to the diagram shown in FIG. 3a.

Figure 3A:
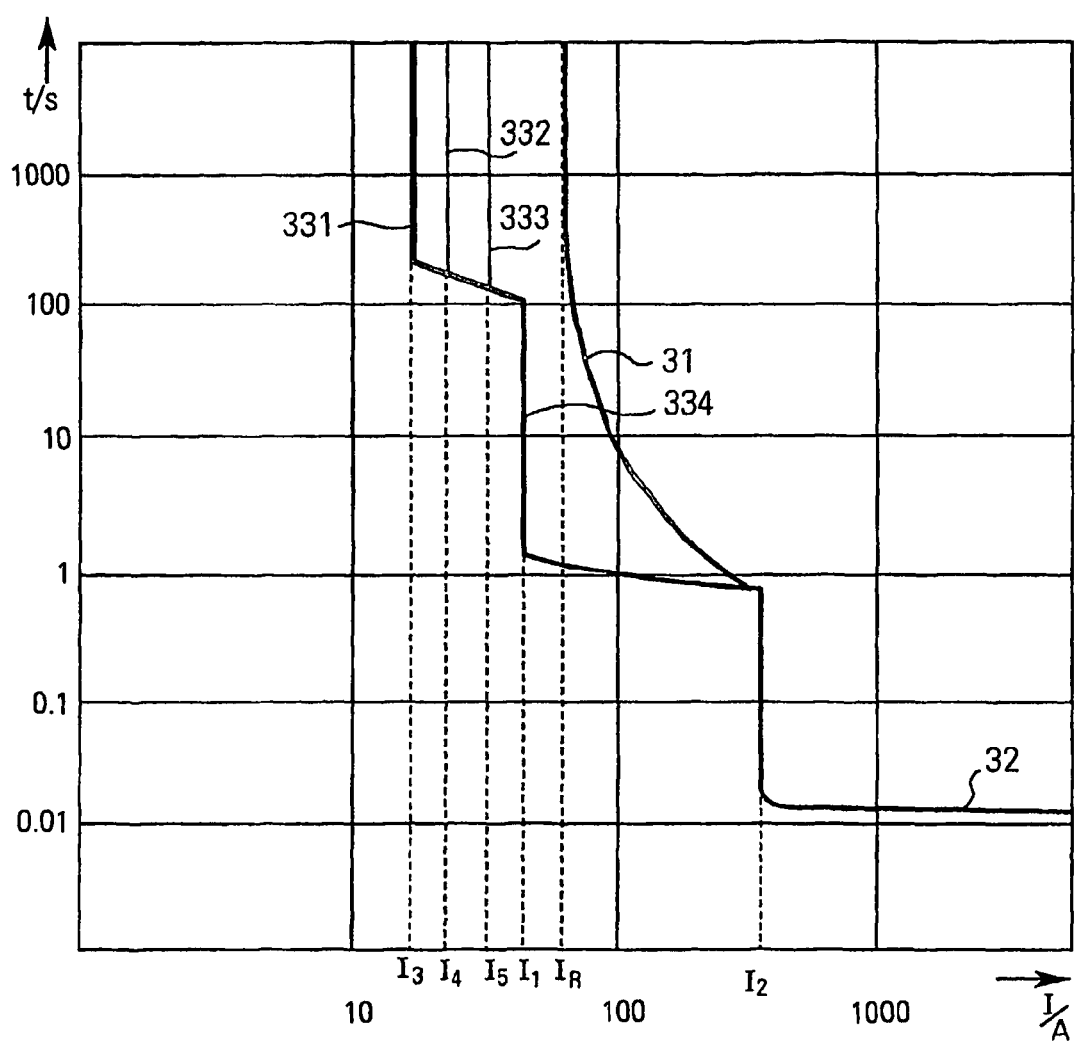
FIG. 3a, b show t-I diagrams to illustrate the operation of embodiments of the electric circuit breaker.

FIG. 3a shows a t-I diagram to illustrate the reaction of the electric circuit breaker to various load conditions, that is levels of current flowing through the circuit breaker. The horizontal axis of this diagram indicates the level of current I, while the vertical axis of this diagram indicates the response time t of the circuit breaker for a given current level I.

In FIG. 3a, reference numeral 31 denotes a first section of a curve representing a functional relation between current levels in a current interval between $I_R$ and $I_2$ and the associated response time. Reference numeral 32 denotes a second section of the curve for current levels above I2. The curve 31, 32 describes the behaviour of the thermo-magnetic current detector 12, $I_R$ denoting the rated current of the current detector 12. Curve sections 331 to 333 for current intervals between $I_3$, $I_4$, $I_5$, respectively on the one hand and $I_1$, on the other hand, as well as the curve section 334 for currents between $I_1$ and $I_2$, describe the behaviour of the current detector 15, processor 16 and trigger device 13. In the following, the operation of the circuit breaker shown in FIG. 2 will be explained with reference to these curves shown in FIG. 3a.

In this embodiment, the electric circuit breaker stores in the memory MEM in the command receiver 17 a current threshold command CC which identifies one of the curves 331, 332 and 333 associated with respective current thresholds $I_3$, $I_4$, $I_5$, respectively. This current threshold command was previously received from the external through the command interface IF of the electric circuit breaker. In order to explain the operation of the electric circuit breaker, at first an operating condition is assumed, that the load current I through the electric circuit breaker is below the programmed current threshold, say $I_4$ in FIG. 3a, presently stored in the memory MEM. In this case, the processing means 16 will apply a characteristic curve 332 defined by the stored current threshold command 14. Since the current load is below the current-threshold the processor 16 will not generate a tripping signal, and the switch 11 will remain closed such that the current I will continue to flow. Assuming now the occurrence of an overload condition resulting in a current I larger than the programmed current threshold I4, the process will process the detected current level reported from current detector 15 in accordance with the programmed current threshold 14 by measuring the time for which this overload condition continuously prevails. If the duration of the overload condition reaches the response time associated with the detected current level I, as represented by curve 332, the processor will generate the tripping signal 14 which will cause the switch 11 to break the electric circuit and hence, terminate the flow of current in the electric circuit 3. In the example shown in FIG. 3a, an overload condition in the interval between $I_4$ and $I_1$ will result in a response time between about 200 seconds for current level just above the programmed threshold I4, and about 100 seconds if the current level approaches $I_1$. In other words, the processor 16 is adapted to generate the tripping signal in response to a detected overload condition in such a way, that the response time also depends on the amount of overload. In the exemplary diagram of FIG. 3a, all the three curves 331, 332 and 333 join a curve 334 at the current level I1. If an overload condition above the threshold $I_1$ is detected by the current detector $1_5$ in FIG. 1, the processor 16 will generate the tripping signal 14 as soon as the overload condition above the threshold $I_1$ has prevailed for more than about 1 sec., as represented by the curve section 334. The response times t associated with the various current levels may be predefined, or they may be provided programmable by the current threshold command CC.

The curve section 31 represents the function of the thermal element in the thermo-magnetic current detector 12 shown in FIG. 2. From FIG. 3a it is evident, that due to the operation of the processor 16 in conjunction with the current detector 15 and the tripping means 13 as just described, the thermo-magnetic current detector 12 should not get the opportunity to cause the switch 11 to break the electric circuit, because for a given overload condition, the processor 16 will generate the tripping signal 14 with a shorter response time than the thermal response time depicted by the curve section 31 of the thermo-magnetic current detector 12. In the embodiment shown in FIG. 3a, only for extremely high overload conditions approaching the magnetic force threshold $I_2$ of the thermo-magnetic current detector 12, the response time of the thermo-magnetic current detector 12 and in particular the response time of the electromagnetic components of that current detector 12, will be shorter than the response time of the processor 16. Accordingly, the thermo-magnetic current detector 12 offers a backup function to make sure that the electric circuit breaker will respond to overload conditions with an interruption of the electric circuit 3 even if a fault occurs in any of the elements 13 to 17 shown in FIG. 2.

In the specific example shown in FIG. 3a, the current threshold $I_1$ may be predetermined in order to provide a fixed upper current limit. It may coincide with the rated current $I_R$ of the thermo-magnetic current detector 12, because in this example, any load condition above the current level $I_R$ will by virtue of the thermo-magnetic current detector 12 cause the switch 11 to break the electrical circuit 3, unless the processor 16 causes an earlier tripping of the switch 11. It is important to note that this specific example shall not be construed to limit the technology in any way. Of course, it is possible to adapt the current thresholds $I_1$ to $I_5$ shown in FIG. 3 to a variety of different needs in accordance with the particular design without departing from the principles of the present invention. It is, however, preferable to program the electric circuit breaker such that the programmed t-I curve remains below the curve sections 31, 32 of the thermomagnetic current detector 12.

While the embodiment of FIG. 3a provides a single programmable current threshold only, it can be advantageous to adapt the processor 16 such that the current threshold command CC identifies individual t-I curves to be applied by the processor 16 in processing the information about the detected current level CL. The plurality of curves available for selection can be defined in the processor 16 or in the current threshold command receiver 17 in the form of tables or in the form of mathematical equations characterizing the set of curves in parameterised form.

Figure 3B:
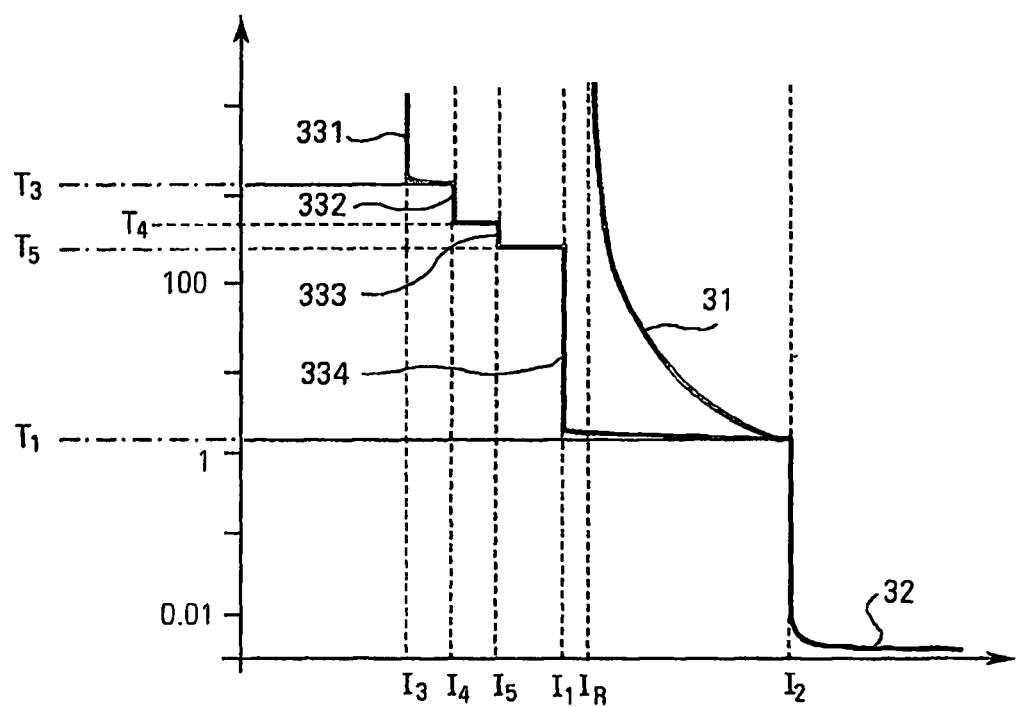

FIG. 3b shows another example of a t-I curve adopted by the processor 16. In this embodiment, not only the current thresholds $I_1$, $I_3$, $I_4$, $I_5$ are provided programmable, but also the response times t1, t3, t4, t5 associated with the current intervals between adjacent thresholds, as depicted in FIG. 3b. In this embodiment, a current threshold command CC contains at least one current threshold $I_j$ and at least one associated response time tj. While all current thresholds $I_1$, $I_3$, $I_4$, $I_5$ are shown to be less than $I_R$, this is not mandatory. Current thresholds above $I_R$ can be programmed with associated response times below the curve 31, 32 in FIG. 3b.

Figure 4:
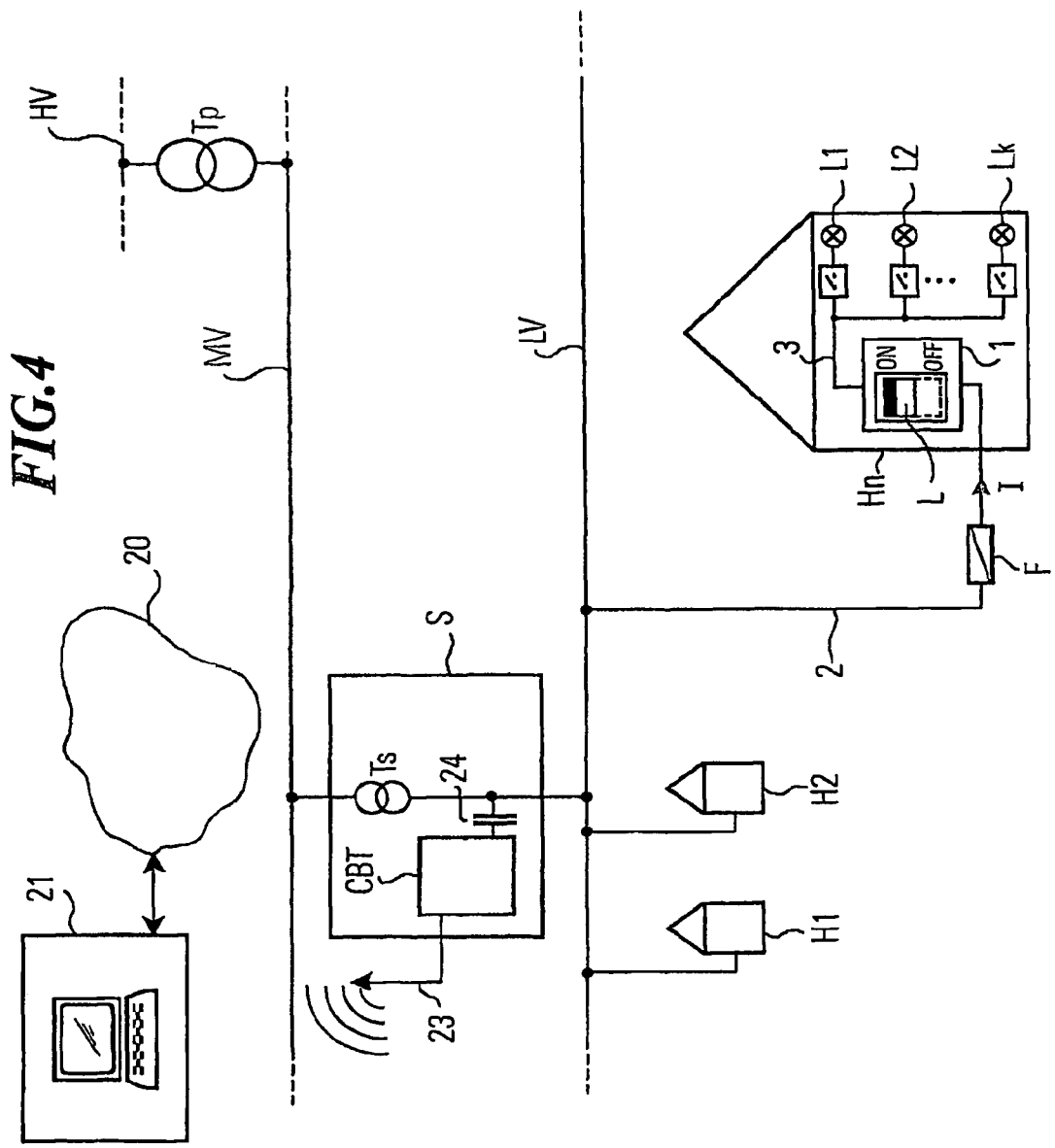
FIG. 4 shows an embodiment of an electric power distribution network comprising central control facilities.

FIG. 4 shows an example embodiment of an electric power distribution network comprising central control facilities for generating current threshold commands CC. In FIG. 4, elements similar to the elements shown in FIG. 1 have been denoted with the same reference signs. With respect to these elements, reference is made to the description for FIG. 1 in order to avoid repetitions.

In FIG. 4, S denotes a secondary substation for transforming the voltage carried on the medium voltage network MV into the low voltage carried on the low voltage network LV. To this end, the secondary substation S comprises a transformer Ts as described above. CBT denotes a communication device associated with the secondary substation S. The communication means CBT can generate current threshold commands addressed to individual ones or to specified groups of electric circuit breakers 1 at the consumer premises H1, H2, ..., Hn which are connected to the LV network section supplied by the secondary substation S. Reference numeral 24 denotes a coupling device, e.g. a coupling capacitor, for coupling the current threshold commands CC generated by the communication device CBT to the power supply line 2 of the LV network. Accordingly, in the embodiment shown in FIG. 4, the LV network section supplied by the secondary substation S not only serves to distribute electrical power to the consumers H1, H2, ..., Hn, but also serves as a communication medium for transmitting the current threshold commands CC to individual electric circuit breakers 1. In this embodiment, the communication device CBT detects the present load condition of the network section. The communication device CBT comprises suitable processing facilities to process the detected load condition, that is the power presently supplied by the secondary substation S to its LV network section, in order to generate appropriate current threshold commands to selected ones or to all electric circuit breakers 1 at the consumer premises H1, H2, ..., Hn of that LV network section. If the overall load condition approaches a current limit or power limit e.g. of the secondary substation S, the communication device CBT is programmed to generate current threshold commands and broadcast them via the LV network section to the consumers H1, H2, ..., Hn of the network section. The electric circuit breakers 1 at the consumer premises receive the broadcast current threshold command and store it in their memory MEM. In this way, as a reaction to a critical load situation in the entire LV network section of the secondary substation S, all electric circuit breakers 1 can lower their current thresholds such that only the consumers presently drawing a large amount of current will be disconnected from the LV network section. In this way, a complete shut off of the entire LV network section can be avoided. If an effected consumer disconnects some of the loads L1, L2, ..., LK from the power supply line 3, he will be able to reconnect to the LV network upon operation of the lever L of the electric circuit breaker 1. Accordingly, in the embodiment of FIG. 4 the communication device CBT can adaptively control the maximum power which each consumer may draw from the network in accordance with the present overall load condition, to prevent the occurrence of severe overload conditions which would require the shut down of the entire LV network section. Under light load conditions the CBT will generate appropriate broadcast current threshold commands in order to increase the current thresholds programmed into the electric circuit breakers 1 at the various consumer premises H1, H2, ..., Hn.

It can be particularly advantageous to distinguish 30 between different types of consumers. There are some types of consumers, e.g. hospitals, which need to be supplied with electric power in any case. For other types of consumers, e.g. for normal households, it may be assumed that a temporary reduction of the current threshold will have less severe impacts. Accordingly, it may be advantageous to provide a consumer type indication together with a programmable current threshold command CC from the communication device CBT, and to store a corresponding predefined type indication in each of the electric circuit breakers in accordance with the type of consumer. This consumer type indication allows that in order to prevent a complete black out under severe load conditions, the CBT will at first lower the current thresholds of such types of consumers which are less dependent on a guarantied subscribed power level, and to gradually extend the reduction of the current thresholds to other types of consumers, if this turns out to be necessary to prevent a complete black out.

It is important to note that while this concept has been shown and described with regard to consumers connected to an LV network section supplied by a secondary substation S, the same concept can also be applied in other network portions higher up in the network hierarchy. E.g., electric circuit breakers programmable as described above, can be provided to protect sections of the MV network, with communication device being located at the primary substations Tp which monitor the present load conditions and which generate appropriate current threshold commands to the electric circuit breakers in the MV network and/or to the electric circuit breakers at the consumer premises supplied by the affected MV network section.

Reference numeral 23 in FIG. 4 denotes means for connecting the communication device CBT with central administration and control facilities 21 through a public wireless telecommunication network 20. The central administration and control facilities 21 can be provided to administrate larger portions of the network in a hierarchical fashion, using the communication means CBT associated with the secondary substations S as an intermediate communication node. The facilities 21 can be used to administrate supply contracts, e.g. regarding the maximum power subscribed by an individual consumer $H_i$, and to program corresponding current thresholds and/or response times into the electric circuit breaker 1 of consumer $H_i$ in accordance with the contractual provisions agreed with the individual consumer $H_i$, without the need to have service staff visit the consumer premises.

Figure 5:
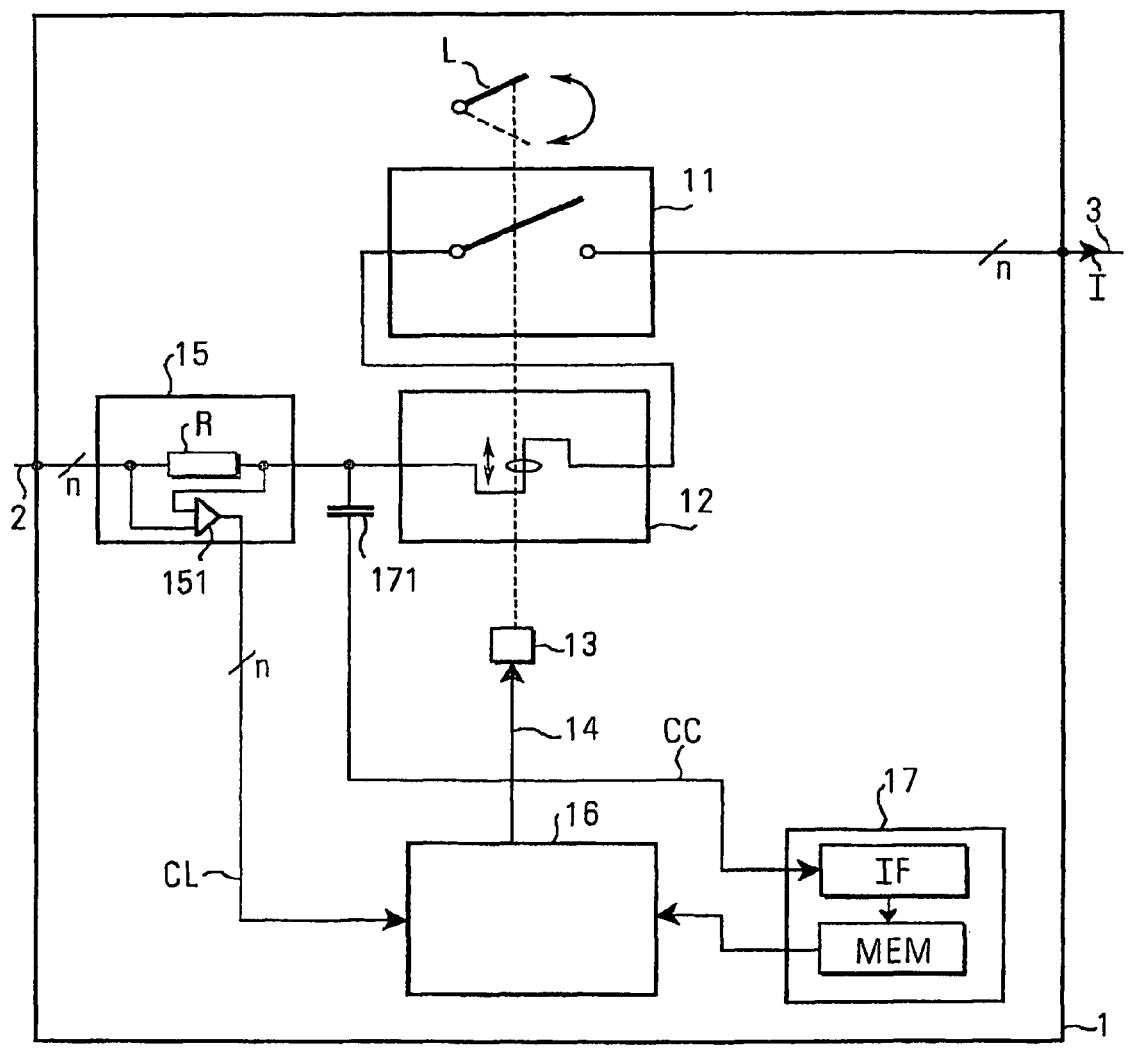
FIG. 5 shows a second embodiment of an electric circuit breaker.

FIG. 5 shows an example embodiment of an electric circuit breaker 1 in the electric power distribution network shown in FIG. 4. In the electric circuit breaker 1 of FIG. 5, elements similar to the elements shown in FIG. 2 have been denoted with the same reference numerals, such that with regard to these elements reference can be made to the description given for FIG. 1.

In the embodiment of FIG. 5, the current threshold command receiver 17 is adapted to receive the current threshold commands CC via power line communication from the power supply line 2 which connects the consumer Hn to the LV network. Reference numeral 171 denotes a capacitive coupling means for taking the power line communication signals generated by the communication means CBT in FIG. 4 from the power supply line 2. These power line communication signals carrying the current threshold commands CC are received by the command interface IF and stored in the current threshold command memory MEM, as described above. A large variety of ready made products and solutions is available on the market for implementing power line communication systems. Any of these power line communication solutions can be adopted for transmitting current threshold commands CC to the electric circuit breaker 1, such that a detailed description of power line communication technology may be omitted here.

Figure 6:
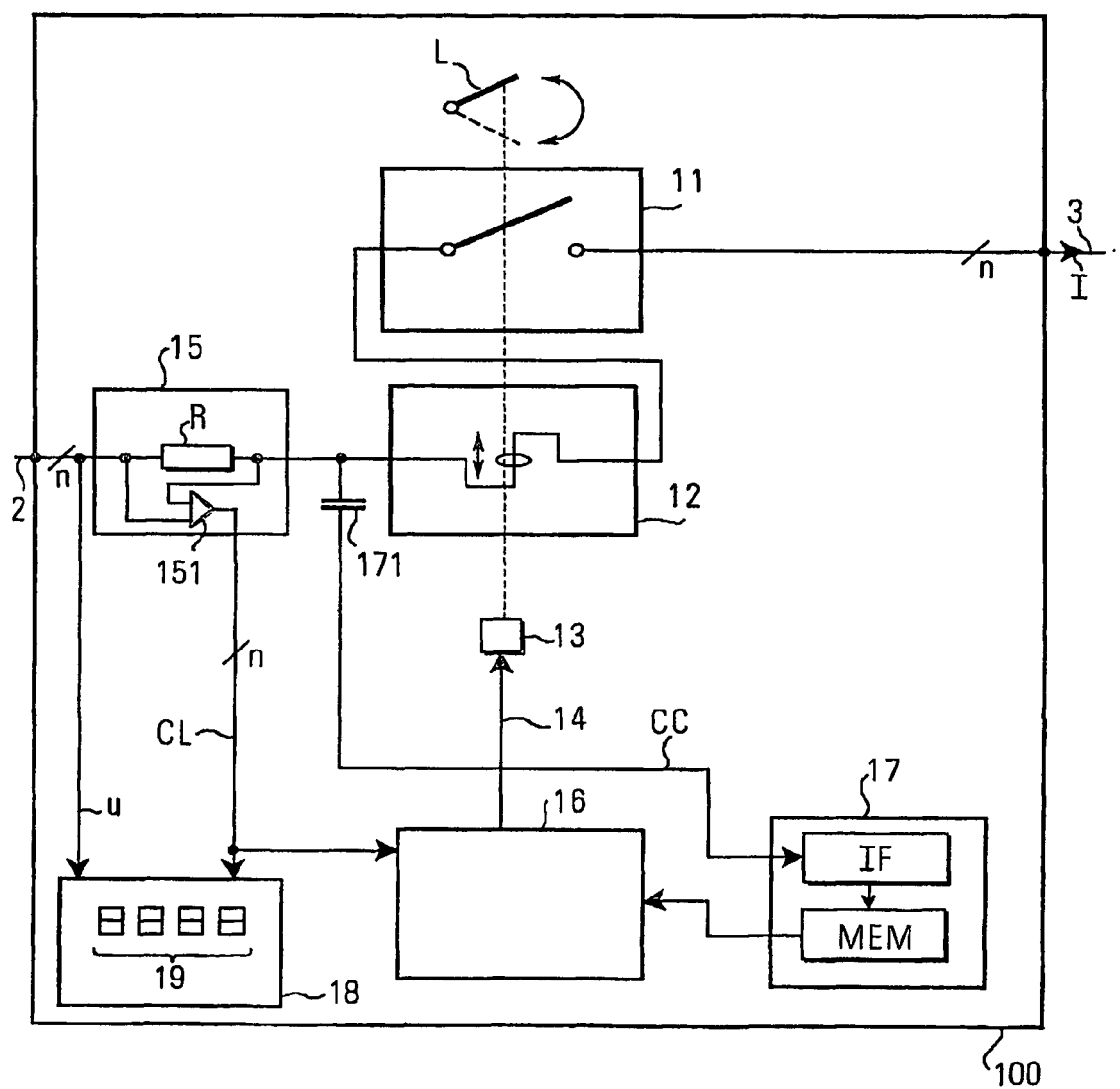
FIG. 6 shows a third embodiment of an electric circuit breaker.

FIG. 6 shows a third example embodiment of an electric circuit breaker 1. This embodiment differs from the embodiment of FIG. 5 in the provision of an energy meter 18 for measuring and counting the energy drawn by the consumer from the power distribution network through the power supply line 2. In the embodiment shown in FIG. 6, the energy meter 18 receives a current level detection signal CL from the current detector 15. The energy meter 18 calculates the energy from the detected current level CL and the detected supply voltage U and accumulates at least the active energy drawn from the power supply network. The accumulated amount of energy is displayed on a display 19. All other components of the electric circuit breaker 1 of the embodiment of FIG. 6 correspond to the components shown in the second embodiment of FIG. 5. In this respect, reference is made to the description already given above.

Figure 7:
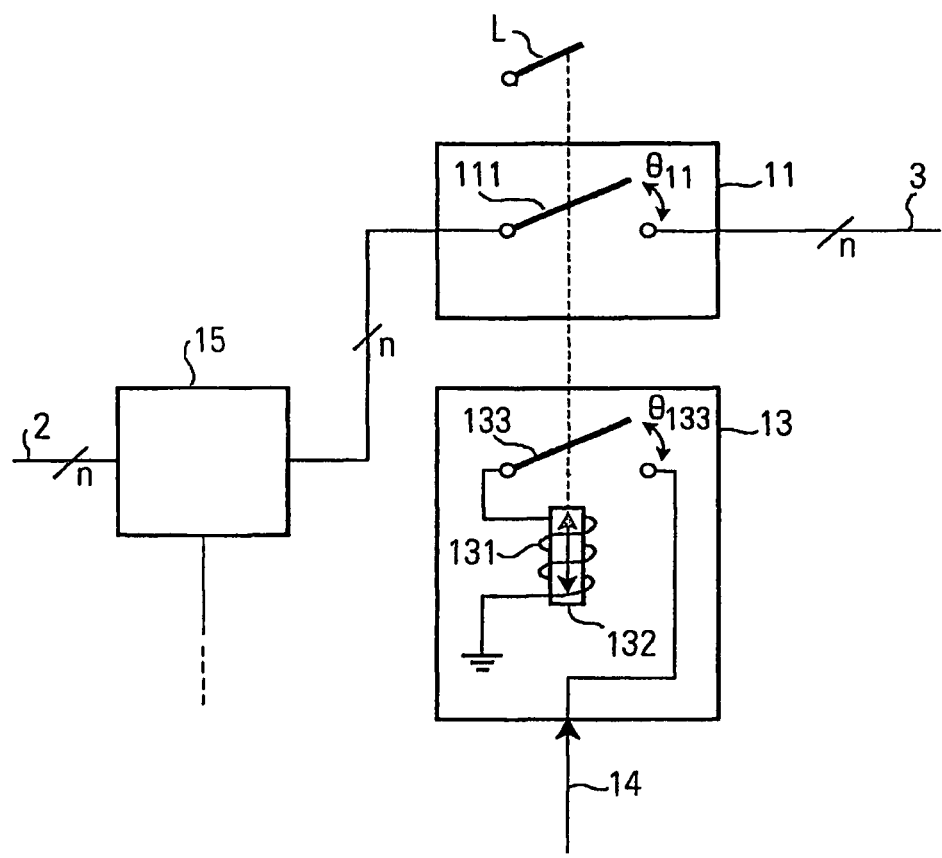
FIG. 7 shows an advantageous embodiment of the element 13 for causing the switch to break the electrical circuit in response to a tripping signal.

FIG. 7 shows an advantageous example embodiment of the trigger device 13 for causing the switch to break the electrical circuit in response to a tripping signal. This embodiment is suitable for any of circuit breaker embodiments. In FIG. 7, elements similar to or identical with elements shown in the preceding figures have been denoted with the same reference numerals. With regard to these elements reference is made to the description given above. In the embodiment of FIG. 7, the trigger device 13 comprises an electromagnetic coil 131 which is connected to receive the tripping signal 14 from the processor 16. The coil 131 magnetizes a movable element 132 which is mechanically coupled to the contacts 111 of the switch 11. Moreover, the movable element 132 is also coupled with the lever L for manually operating the switch 11. Reference numeral 133 denotes an auxiliary switch mechanically coupled with the movable element 132. The auxiliary switch 133 is connected in series with the coil 131, such that the energization of the coil 131 by the tripping signal 14 depends on the state of the auxiliary switch 133. Reference numeral θ11 denotes a displacement of the movable element 132, e.g. an angle, which is required to open the contacts of the switch 11. Similarly, θ133 denotes a displacement of the movable element 132, e.g. an angle, which is required to open the auxiliary switch 133. According to the embodiment shown in FIG. 7, the switch 11 and the auxiliary switch 133 are constructed such that the displacement θ133 required to open the auxiliary switch 133 is larger than the displacement θ11 required to open the switch 11. When the processor 16 generates a tripping signal 14, this will energize the coil 131 until the displacement of the movable element 132 is large enough to open the auxiliary switch 133. This displacement will then surely be large enough to reliably open the contacts 111 of the switch 11. At the same time it is achieved that a current through the coil 131 will be neither higher nor lower than necessary and will not flow longer than necessary for reliably opening the switch 11. The duration for which the processor 16 generates the tripping signal 14 is uncritical.

According to an advantageous modification of this embodiment, the mechanical coupling of the lever L with the switch 11 is made dependent on whether the coil 131 is energized or not. If the coil 131 is energized, then the lever 11 is decoupled from the switch 11. To this end an electromagnetic coupling element (not shown) can be provided for selectively coupling or decoupling the lever L from the switch contacts 111. The electromagnetic coupling element can have a movable hook, cam, tappet or any other engagement device which can be biased e.g. by a spring, to mechanically couple the lever L with the contacts 111 of switch 11. The electro magnetic coupling element electro magnetically withdraws the engagement device to decouple the lever L from the switch contacts 111 when the coil 131 is energized. When the processor 16 outputs a continuous tripping signal, for instance in response to an external circuit interrupt command (which has caused the switch 11 to break the electrical circuit 3) and a user then tries to move the lever L into the closed position of the switch 11 to reestablish the electrical circuit 3, this will result in that the auxiliary switch 133 will close before the switch 11 can close, due to the fact that because the displacement required to open the auxiliary switch 133 is larger than the displacement required to open the switch 11, the switch 133 will close earlier than switch 11 can close. This will then energize the coil 131 and decouple the lever L from the switch contacts 111 before the switch contacts 111 can close the electrical circuit. The energized coil will furthermore generate a force upon the lever L which is perceivable by the user, to urge the lever back into the open position. On the other hand, if there is no longer a tripping signal from the processor 16, the lever can be moved back into the closed position.

The electromagnetic coupling element (not shown) can either comprise its own actuator (e.g. a coil) electrically connected in series with the coil 131, or the electromagnetic coupling element can be connected into the magnetic circuit which is energized by the coil 131, such that whenever the coil 131 magnetizes the movable element 132, a magnetic force is exerted also upon the engagement means to withdraw from engagement with the switch contacts 111.

Figure 8:
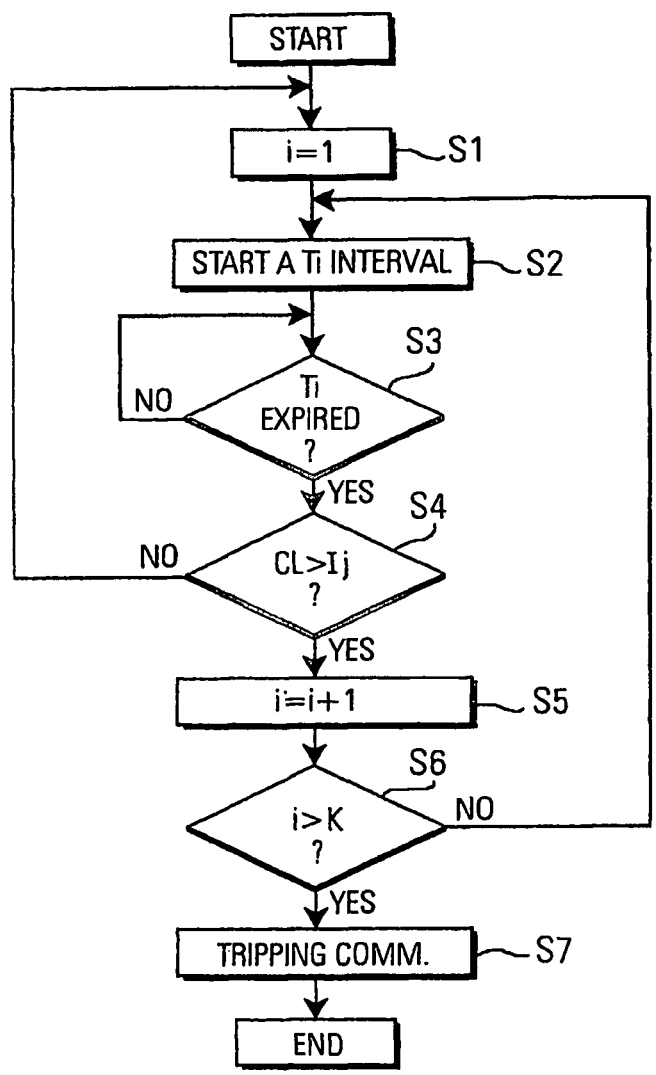
FIG. 8 shows a flow diagram to illustrate the operation of an embodiment of the processor means of the electric circuit breaker.

FIG. 8 shows a flow diagram to illustrate the operation of an example embodiment of the processor. In this embodiment, the processor comprises a micro processor and associated program and data memory, as well as input/output port facilities. Such hardware structures are available on the market e.g. in the form of embedded micro controller solutions wherein the micro processor as well as the required peripheral devices like memories and I/O ports are integrated on a single chip. The embodiment shown in FIG. 8 is but one of a large variety of possible implementations of the processor 16 in the electric circuit breaker 1, as will be readily apparent to those skilled in the art. In this embodiment, the micro processor in the processor 16 is programmed, for example to perform the flow of operations shown in FIG. 8. This flow of operations achieves the processing of the detected current level CL and the generation of the tripping signal 14 depending on a stored programmed current threshold command maintained in the memory MEM, which indicates a programmed current threshold Ij and the associated response time Tj. The flow of FIG. 8 implements a retriggerable measurement of the duration of an overload condition when the detected current level CL is above the current threshold Ij, wherein a non-steady overload condition will not lead to the generation of a tripping command 14, as will be explained in the following.

S1 in FIG. 8 denotes an operation to initialise an incremental index i to take the value 1. This incremental index will be used to identify one of K sub-intervals Ti of the programmed response time Tj. The flow of operation in FIG. 8 queries for each of the K sub-intervals Ti whether the overload condition prevails. If and only if the overload condition was present for K successive sub-intervals Ti, the tripping signal 14 will be generated to break the electrical circuit 3.

In the operation S2 of FIG. 8, a timer is loaded with the value Ti. The operation S3 serves to check whether the timer set in the operation S2 has expired (branch Y) or not (branch N). After the expiry of the sub-interval Ti, the flow proceeds to the operation S4 wherein it is checked whether the current level CL is larger than the programmed current threshold Ij. In the negative case (branch N), the flow returns to the operation S1 to reinitialise the incremental index i. In the affirmative (branch Y of operation S4), the flow moves on to the operation S5 in order to increment the index i. Then, in operation S6 it is checked whether the incremental index exceeds a value K which satisfies the condition that K times Ti equals the programmed response time Tj. In the negative, the overload condition did not yet prevail for more than the programmed response time Tj and the flow returns to the operation S2. In the affirmative (branch Y), the flow proceeds to the operation S7 to generate a tripping command, that is the tripping signal 14 of the processing means 16.

The flow of operations shown in FIG. 8 can be initiated as an interrupt routine which will be executed whenever the current detector 15 indicates that a programmed current threshold Ij has been exceeded. In the alternative, the flow of FIG. 8 can be executed repeatedly at regular time intervals, e.g. triggered by a timer interrupt, or the flow of operations S1 to S7 can be implemented as a subroutine repeatedly called by other software routines implemented for execution on the micro controller, e.g. in a polling mode. If the current threshold command indicates a plurality of programmed current thresholds Ij and associated response times Tj, as shown e.g. in FIG. 3*b*, the flow of operations in FIG. 8 will be executed for each programmable pair of current thresholds Ij and associated response times Tj.

Figure 9:
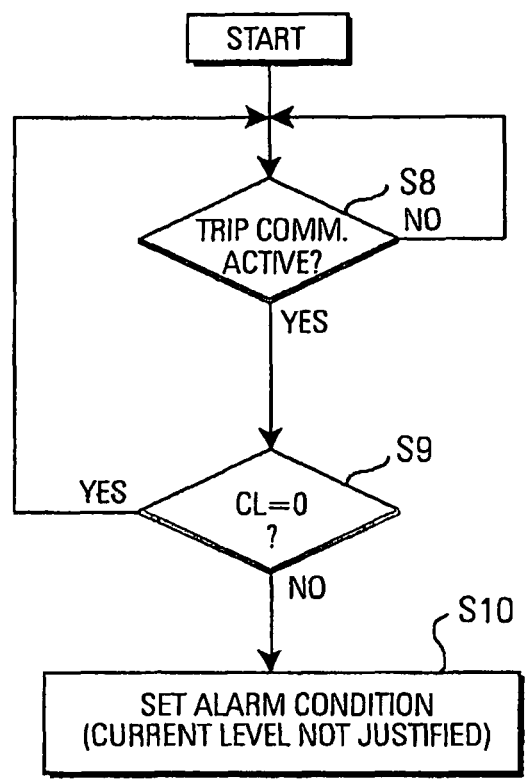
FIG. 9 shows an extension of the flow diagram shown in FIG. 7.

FIG. 9 shows an advantageous extension which provides a safety check when a tripping signal has been generated, in order to confirm that the detected current level CL has reached zero. In the operation S8 it is checked whether an active tripping signal is present. As soon as a tripping signal exists (branch Y in the operation S8), a check is made whether the current level CL has reached zero. In the negative case (branch N in the operation S9), the flow proceeds to the operation S10 to set an alarm condition because of the detection of a current level larger than zero despite the generation of a tripping command for the switch 11. This alarm condition can be an audio and/or visual indication at the electric circuit breaker 1. More preferably, the electric circuit breaker 1 comprises means to report this alarm condition to the communication means CBT and/or to the central administration and control facilities 21 which will then take appropriate action.

Figure 10:
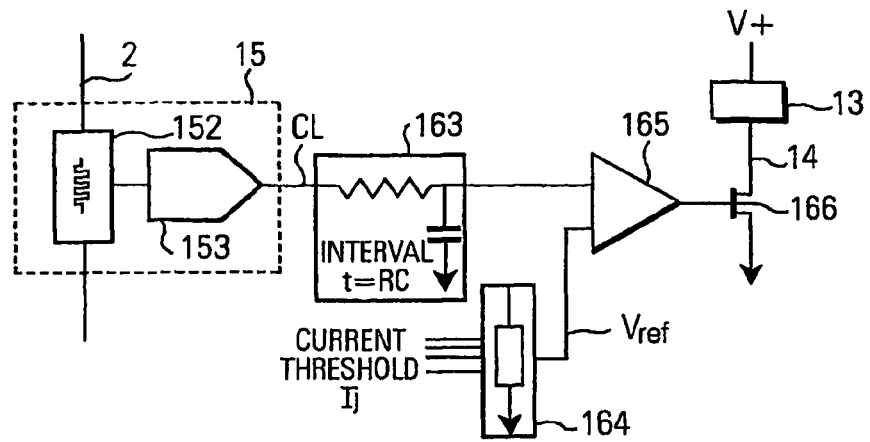
FIG. 10 shows a first embodiment of a hardware implementation of the processor.

FIG. 10 shows a further example embodiment of the current detector 15 and the processor 16. In the embodiment of FIG. 10, reference numeral 152 denotes a current transducer for transducing the current flowing through the power supply line 2. Numeral 153 denotes a converter for performing a root mean square conversion of the current detected by current transducer 152, and to generate a current level detection signal CL. Numeral 163 denotes a filtering and averaging circuit comprising an RC element for averaging and delaying the current level detection signal CL. Numeral 164 denotes a circuit for transforming the programmable current threshold into a reference voltage Vref, e.g. by means of using a digital potentiometer, as such well known in the art, which converts the digital current threshold value into a tap position of the potentiometer. Numeral 165 denotes a comparator circuit which compares the output signal of the filtering and averaging circuit 163 with the programmed reference voltage Vref. Numeral 166 denotes a driver circuit, e.g. a MOSFET transistor or bipolar transistor which receives at its gate the output signal from the comparator circuit 165. As soon as the output signal of the circuit 163 exceeds the programmed reference voltage Vref, the comparator circuit 165 generates a gate signal such that the transistor 166 turns conductive and causes a tripping current to flow through the device 13 which will then cause the switch 11 to break the electrical circuit. In this non-limiting example embodiment, the elements 163, 164, 165 implement the processor 16 using hardware components.

Figure 11:
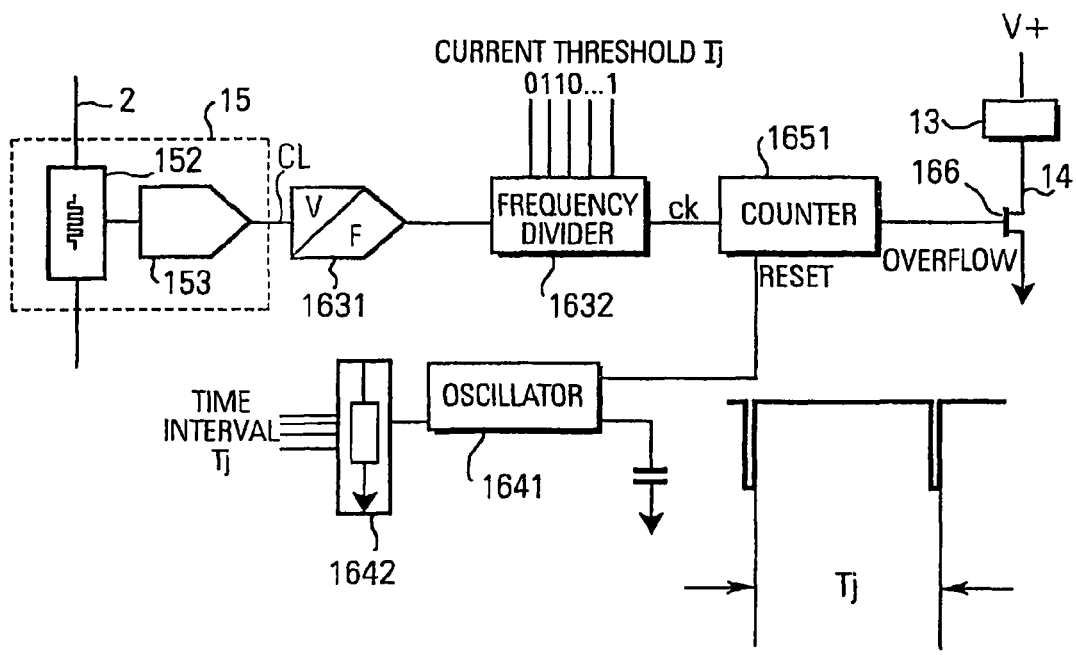
FIG. 11 shows a second embodiment of a hardware implementation of the processor.

FIG. 11 shows yet another non-limiting example embodiment of the current detector 15 and the processor 16. Elements similar to the elements shown in FIG. 10 are denoted with the same reference numerals. With respect to these elements reference is made to the description of FIG. 10. In FIG. 11, Numeral 1631 denotes a voltage frequency converter for converting the current level detection signal CL into a corresponding frequency. Numeral 1632 denotes a frequency divider which divides the frequency provided by the current frequency converter 1631 by a factor determined by the programmed current threshold stored in the memory MEM of the electric circuit breaker 1. The frequency divider outputs a divided signal ck for clocking a counter 1651. Numeral 1642 denotes a circuit for converting the programmed time interval associated with the programmed current threshold from the stored digital representation in the memory MEM into a signal for controlling the frequency of an oscillator 1641. The oscillator 1641 outputs a reset signal to the counter 1651 with a frequency in accordance with the programmed time interval Tj. If the output signal of the frequency divider CK occurs with a frequency higher by a given factor than the frequency of the reset signal, the counter 1651 will output an overflow signal to the driver transistor 166 in order to generate the tripping signal.

Accordingly, the non-limiting example embodiment shown in FIG. 11 implements the processor 16 in hardware such that the processor 16 can generate the tripping signal 14 depending on a stored programmable current threshold command indicating a current threshold Ij and an associated response time interval Tj, and depending on the detecting current level flowing in the electrical circuit 3.

The embodiments so far described comprise a switch 11 which can be tripped by the triggering device 13 and also by the current detector 12 advantageously provided as a back up. The switch 11 can be a mechanical switch with movable contacts 111 to break or close the electric circuit. Alternatively, the switch 11 can be composed of a series connection of a mechanical switch and a solid state switch, e.g. a triac. The mechanical switch is mechanically coupled with the second means 12, and the solid state switch receives a control signal from the triggering device 13 in accordance with the tripping signal 14 from the processor 16.

In the embodiments described above, the breaker characteristics are achieved by detecting the current flowing through the electric breaker, and controlling the breaker switch in accordance with one or more programmable current thresholds and related response time intervals. Thermo-magnetic characteristics of the breaker can be provided as a safety margin, while the actual operating thresholds can be programmed into the electric breaker. This allows to make the trigger threshold dependent e.g. on the present load in the electricity distribution network, on the time of day, or on more complex parameters like type of customer (e.g. hospital versus private consumer) and the present load situation in the electricity distribution network. The programmable electric breaker thus allows a remote adaptation to changes in the supply contract and/or effective counter measures in emergency situations, e.g. when approaching the maximum load which the network can bear.

While the embodiments described above are based on a detection of the current flowing in the electrical circuit 3, the skilled person will understand that it would be possible to achieve essentially the same effects if instead of or in addition to the detection of the current flowing in the circuit 3, the active and/or reactive power fed into the electrical circuit 3 is detected. Similarly, the programmable current thresholds described above may define current thresholds or power thresholds or a suitable complex entity composed of current and power. Whenever the foregoing description refers to the detection of current levels or the programming of current thresholds, the term current is to be understood in this more general sense. Reference signs in the originally-filed claims shall not be construed to limit their scope.

The invention claimed is:

1. An electric circuit breaker apparatus for protecting an electrical circuit including a source and a load against excessive current loads, comprising:
   circuit breaker circuitry arranged in the electrical circuit in series between the source and the load and including a first circuit breaker corresponding to a mechanical interruption element in series with a second circuit breaker corresponding to a solid state interruption element;
   a first remotely programmable circuit breaker trip device programmed to receive an external command with a programmable current threshold corresponding to an overload condition, detect a load current level in the electrical circuit being carried by the solid state interruption element, and cause the second circuit breaker to break the electrical circuit depending on the detected current level in accordance with a first specified current duration associated with the programmable current threshold by activating the solid state interruption element so that load current no longer flows to the load;
   a second electrical circuit breaker trip device of a different type than the first remotely programmable circuit breaker trip device configured to cause the first circuit breaker to break the electrical circuit in accordance with a second specified current duration if a current flowing in the electrical circuit exceeds a predetermined rated current for more than the second specified current duration corresponding to the same type of overload condition by activating the mechanical interruption element to break the electrical circuit so that load current no longer flows to the load,
   wherein the predetermined rated current is larger than the programmable current threshold.

2. The electric circuit breaker apparatus according to claim 1, wherein the first specified current duration is different than the second specified current duration.

3. The electric circuit breaker apparatus according to claim 2, wherein the first specified current duration is longer than the second specified current duration.

4. The electric circuit breaker apparatus according to claim 1, wherein the first remotely programmable breaker trip device includes:
   a receiver configured to receive and store the programmable current threshold;
   a first current detector configured to detect a current level in the electrical circuit;
   a processor programmed to generate a tripping signal depending on the stored programmable current threshold and the detected current level; and
   a triggering device configured to cause the circuit breaker circuitry to break the electrical circuit, in response to receiving the tripping signal, in accordance with the first specified current duration associated with the stored programmable current threshold; and
   wherein the second circuit breaker trip device includes a second current detector configured to cause the circuit breaker circuitry to break the electrical circuit in accordance with the second specified current duration if a current flowing in the electrical circuit exceeds the predetermined rated current for more than the second specified current duration.

5. The electric circuit breaker apparatus according to claim 1, wherein the second circuit breaker trip device includes:
   a thermal current level detection element; and
   means for causing the switch to break the electrical circuit by activating the mechanical interruption element if the thermal current level detection element exceeds a temperature threshold.

6. The electric circuit breaker apparatus according to claim 1, wherein the second circuit breaker trip device is coupled to the switch arranged in the electrical circuit and includes:
   an electromagnetic current level detector including a coil; and means for causing the switch to break the electrical circuit by activating the mechanical interruption element if a magnetic force generated by the coil exceeds a threshold.

7. The electric circuit breaker apparatus according to claim 1, wherein the second circuit breaker trip device is coupled to the switch arranged in the electrical circuit and includes:
a thermal current level detector configured to thermally detect an amount of current flowing in the electrical circuit;
means for causing the switch to break the electrical circuit by activating the mechanical interruption element if the thermal current level detector exceeds a temperature threshold determining the rated current;
an electromagnetic current level detector including a coil configured to generate a magnetic force in accordance with the amount of current flowing in the electrical circuit; and
means for causing the switch to break the electrical circuit by activating the mechanical interruption element if the magnetic force generated by the coil exceeds a force threshold;
the electromagnetic current detector and the thermal current level detector being dimensioned such that an electrical current level corresponding to the force threshold is higher than the rated electrical current level.

8. The circuit breaker apparatus according to claim 4, wherein the triggering device, the second current detector, and the switch are integrated into a single unit.

9. The electric circuit breaker apparatus according to claim 1, wherein the first remotely programmable circuit breaker trip device comprises:
means for converting an electrical current flowing in the electrical circuit into a voltage; and
means for detecting the voltage and outputting a corresponding current level detection signal.

10. The electric circuit breaker apparatus according to claim 9, wherein the first remotely programmable circuit breaker trip device comprises a shunt impedance or an arrangement of coils magnetically coupled to constitute a transformer, a hall effect device, a magnetoresistor, or a Rogosky coil.

11. The electric circuit breaker apparatus according to claim 4, wherein the processor is arranged to generate the tripping signal after the detected current level has continuously exceeded the programmed current threshold for the first specified current duration.

12. The electric circuit breaker apparatus according to claim 11, wherein the first specified current duration is programmed to depend on the detected level of current in the electric circuit.

13. The electric circuit breaker apparatus according to claim 11, wherein the receiver is configured to receive and store a command which specifies the first specified current duration.

14. The electric circuit breaker apparatus according to claim 12, comprising:
means for storing a second current threshold higher than the programmed current threshold, wherein:
the first specified current duration includes a first time duration, predetermined or programmed, corresponding to the detected current level being above the programmed current threshold and below the second current threshold, and a second duration, predetermined or programmed, shorter than the first duration, and corresponding to the detected current level being above the second current threshold.

15. The electric circuit breaker apparatus according to claim 14, comprising:
means to receive a second current threshold command;
the second current threshold storing means being arranged to store the second current threshold in accordance with the received second current threshold command.

16. The electric circuit breaker apparatus according to claim 14, wherein:
the programmable current threshold is lower than the predetermined rated current; and
the second current threshold is lower than the current level corresponding to the force threshold.

17. The electric circuit breaker apparatus according to claim 11, wherein the processor is configured to:
provide a plurality of functional relations each specifying for a plurality of current levels a respective associated specified current duration; and
select one of the functional relations in accordance with the current threshold command.

18. The electric circuit breaker apparatus according to claim 17, wherein the functional relations are stored in the form of tables or may be calculated.

19. The electric circuit breaker apparatus according to claim 4, wherein the receiver is arranged to receive a circuit close command, the electric circuit breaker further comprising means for operating the switch to close the electrical circuit in response to the circuit close command.

20. The electric circuit breaker apparatus according to claim 4, wherein the receiver is arranged to receive a circuit interrupt command, the electric circuit breaker apparatus further comprising means for operating the switch to break the electrical circuit in response to the circuit interrupt command.

21. The electric circuit breaker apparatus according to claim 4, wherein the receiver is a powerline communication receiver for receiving the commands via a public electric power line which feeds the electric circuit through the switch.

22. The circuit breaker apparatus according to claim 4, wherein:
the triggering device comprises a coil for electro-magnetically driving a movable member and an auxiliary switch connected in series with the coil;
the circuit breaker circuitry and the auxiliary switch being mechanically coupled with the movable member;
a displacement required for opening the auxiliary switch being larger than a displacement required for opening the switch.

23. An electricity meter for measuring the amount of energy supplied to an electricity consumer through an electric circuit, comprising electric circuit breaker apparatus according to claim 1.

24. The electricity meter according to claim 23, comprising:
means for multiplying the detected current level with a supply voltage of the electrical circuit in order to obtain a measure for instantaneous active and reactive power levels supplied to the electric circuit; and
means for integrating the obtained instantaneous power levels over time in order to obtain the active and reactive energy supplied to the electrical circuit.

25. An electricity distribution network, comprising:
at least one electrical power plant for generating electrical power to be distributed to a plurality of consumers;
an electrical power distribution network for distributing the power generated by the at least one power plant to the consumers; and a plurality of electric circuit breaker apparatus including at least one of the electric circuit breaker apparatus defined in claim 1 and a plurality of electricity meters.

26. The electricity distribution network according to claim 25, comprising administration and control facilities for monitoring load conditions in the power distribution network and for generating at least one of the commands for one of the electric circuit breakers in accordance with the monitored load conditions.

27. The electricity distribution network according to claim 26, comprising a plurality of primary substations arranged between high voltage portions and medium voltage portions of the electricity distribution network;

a plurality of secondary substations arranged between medium voltage portions and low voltage portions of the electricity distribution network;

a communication receiver arranged in at least one of the secondary substations for receiving commands from the administration and control facilities and for generating current threshold commands, circuit close commands, and circuit interrupt commands in accordance with commands received from the administration and control facilities;

a power line communication device for injecting the commands into a low voltage portion of the electricity distribution network for transmission to at least one of the electricity consumers;

wherein the administration and control facilities and the communication are arranged to communicate with each other via a public telephone network.

28. The electricity distribution network according to claim 27, wherein the public telephone network is a wireless mobile telephone network.

* * * * *